United States Patent
Atkins et al.

(10) Patent No.: US 6,182,212 B1
(45) Date of Patent: Jan. 30, 2001

(54) METHOD AND SYSTEM FOR AUTOMATED MIGRATION OF USER SETTINGS TO A REPLACEMENT COMPUTER SYSTEM

(75) Inventors: Barry Douglas Atkins; David Carroll Challener, both of Raleigh; Richard Wayne Cheston, Cary, all of NC (US)

(73) Assignee: International Business Machine Corporation, Armonk, NY (US)

( * ) Notice: Under 35 U.S.C. 154(b), the term of this patent shall be extended for 0 days.

(21) Appl. No.: 09/211,072

(22) Filed: Dec. 14, 1998

(51) Int. Cl.$^7$ ........................................ G06F 9/445
(52) U.S. Cl. ........................................................ 713/1
(58) Field of Search ................................ 713/1, 2, 100; 709/328; 717/11

(56) References Cited

U.S. PATENT DOCUMENTS

| | | | |
|---|---|---|---|
| 5,771,381 | * | 6/1998 | Jones et al. ............................ 713/100 |
| 5,832,339 | * | 11/1998 | Invi et al. .............................. 399/83 |
| 5,850,545 | * | 12/1998 | Matsushita ................................ 713/1 |
| 5,977,964 | * | 11/1999 | Williams et al. ....................... 345/327 |
| 6,067,568 | * | 5/2000 | Li et al. ................................. 709/223 |

* cited by examiner

*Primary Examiner*—Thomas M. Heckler
(74) *Attorney, Agent, or Firm*—J. Bruce Schelkopf; Andrew Dillon

(57) ABSTRACT

A method and system are disclosed for automating migration of user system settings from an existing computer system to a replacement computer system in response to a user input. Selected portions of the registry, or central hierarchial data base within the existing computer system are automatically copied and stored in response a user input. A plurality of application program interface (API) routines are then initiated to retrieve and store selected settings within the existing computer system. Adapter binding information for all adapters within the existing computer system are retrieved and stored. The selected portions of the registry, selected settings and adapter binding information are then transferred to the replacement computer system and copied into appropriate registry keys, directories and files, effectively transferring the system settings from the existing computer system to the replacement computer system.

19 Claims, 3 Drawing Sheets

METHOD AND SYSTEM FOR AUTOMATED MIGRATION OF USER SETTINGS TO A REPLACEMENT COMPUTER SYSTEM

BACKGROUND OF THE INVENTION

1. Technical Field

The present invention relates in general to an improved computer system, and in particular to an improved method and system for permitting initial setup of a computer system. Still more particularly, the present invention relates to a method and system for the automated migration of user system settings in one computer system to a replacement computer system.

2. Description of the Related Art

In recent years the personal computer system is undergoing an increasingly rapid evolution in speed, processing power and capacity and available features. As a consequence, users who desire to maintain a "state of the art" capacity must periodically upgrade the hardware capacity of their computer.

When a user upgrades to a new hardware platform a problem is created regarding the user's system settings, preferences, etc. Typically, the new hardware platform includes new device drivers, different peripheral devices and possibly a different operating system. Consequently, the mere copying of files contained within the hard drive storage device of an existing computer system to the hard drive storage device of a replacement computer system will not result in a system which resembles the old system, creating a situation which severely diminishes the user's efficiency until the user learns the new settings.

It is also necessary, in a networked environment, to migrate certain network parameters, such as IP addresses, DNS server addresses, gateway/router addresses, system name and workgroup, printer permissions, etc., so that the new system will be enabled to perform the same kinds of tasks as the old system.

It should therefore be apparent that a need exist for a method and system for automating the migration of user system settings from an existing computer system to a replacement computer system with minimal user intervention.

SUMMARY OF THE INVENTION

It is therefore one object of the present invention to provide an improved computer system.

It is another object of the present invention to provide an improved method and system for permitting initial setup of a computer system.

It is yet another object of the present invention to provide an improved method and system for migrating system settings in one computer system to a replacement computer system.

The foregoing objects are achieved as is now described. A method and system are disclosed for automating migration of user system settings from an existing computer system to a replacement computer system in response to a user input. Selected portions of the registry, or central hierarchial data base within the existing computer system are automatically copied and stored in response a user input. A plurality of application program interface (API) routines are then initiated to retrieve and store selected settings within the existing computer system. Adapter binding information for all adapters within the existing computer system are retrieved and stored. The selected portions of the registry, selected settings and adapter binding information are then transferred to the replacement computer system and copied into appropriate registry keys, directories and files, effectively transferring the system settings from the existing computer system to the replacement computer system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
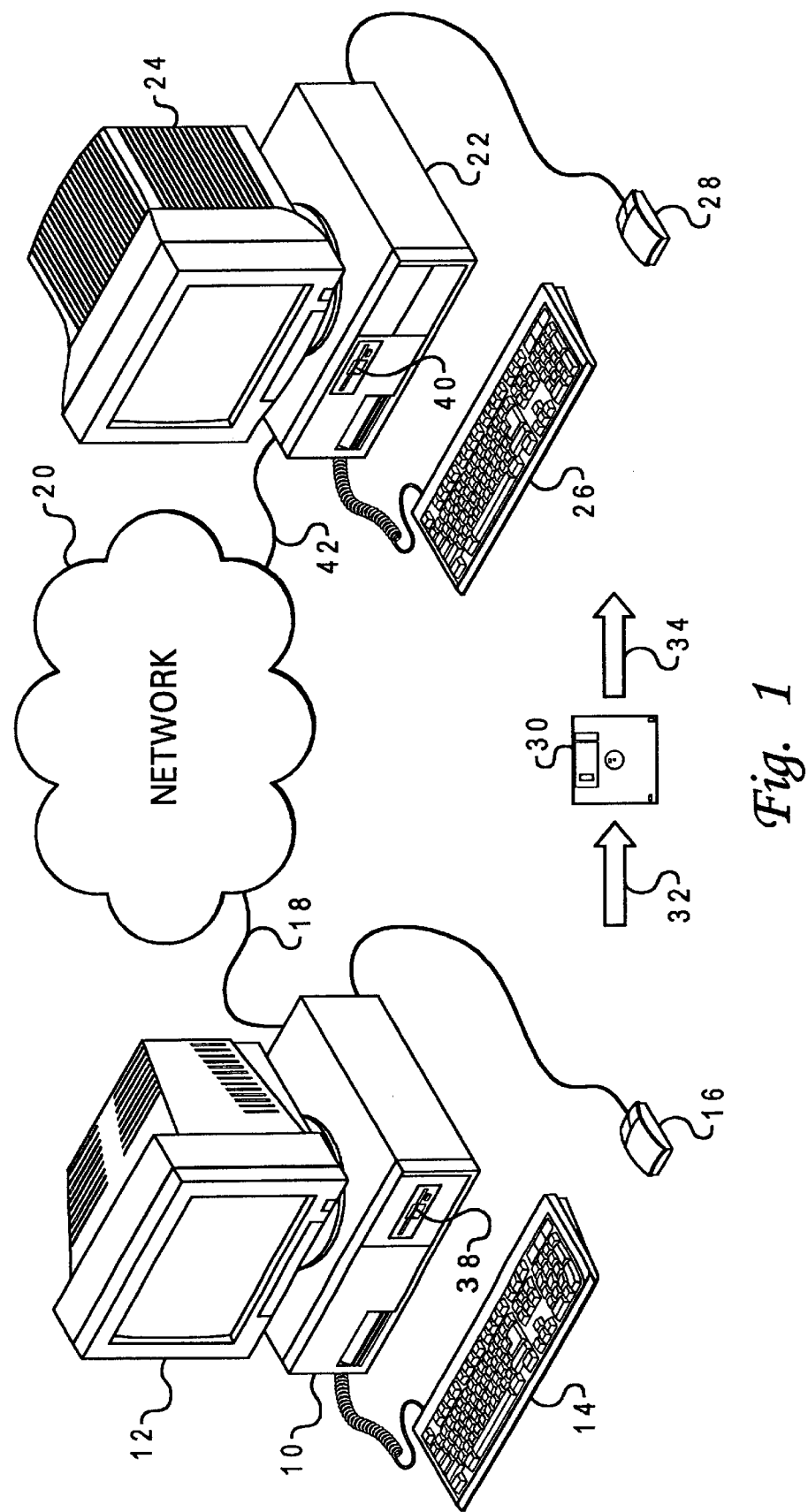
FIG. 1 a partially schematic, partially pictorial representation of the migration of user system settings from an existing computer system to replacement computer system.

With reference now to the figures and in particular with reference to FIG. 1, there is depicted a partially schematic, partially pictorial representation of the migration of user system settings from an existing computer system 10 to a replacement computer system 22. As illustrated, existing computer system 10 includes a display 12, keyboard 14 and graphical pointing device, such as mouse 16. Additionally, a diskette drive 38 is provided. Upon reference into the description contained herein those skilled in the art will appreciate that the migration of user system settings from existing computer system 10 to replacement computer system 22 may be accomplished utilizing a network connection or utilizing a diskette containing a computer program product which is initiated within diskette drive 38 of existing computer system 10 and thereafter transferred manually to diskette drive 40 of replacement computer system 22.

Still referring to FIG. 1, it may seen that existing computer system 10 and replacement computer system 22 are both coupled to network 20 via network cable 18 and network cable 42. Of course, those skilled in the art will appreciate that existing computer system 10 may be coupled to network 20 at the same location and at a different time than replacement computer system 22 is coupled to network 20. That is, a user may copy and store appropriate user system settings in the manner set forth within the present application within network 20 and thereafter replace existing computer system 10 with replacement computer system 22 at the same location to retrieve and install user system settings as described herein.

As depicted, replacement computer system 22 also includes a display 24, keyboard 26 and a graphical pointing device such as mouse 28. Diskette drive 40 may be utilized, in the manner described herein, to receive the computer program product described within the present application which is embodied within diskette 30 and manually transferred from existing computer system 10 to replacement computer system 22 in the manner indicated at arrows 32 and 34.

As those skilled in the art will appreciate replacement computer system 22 may include different device drivers, different peripheral devices, a different display capacity, a different storage capacity and a different operating system. In the manner described herein, those skilled in the art will appreciate that by anticipating each available operating system for an existing computer system and a replacement computer system it is possible to create an automated system for migrating user system settings from an existing computer system to a replacement computer system with minimal user intervention.

Figure 2:
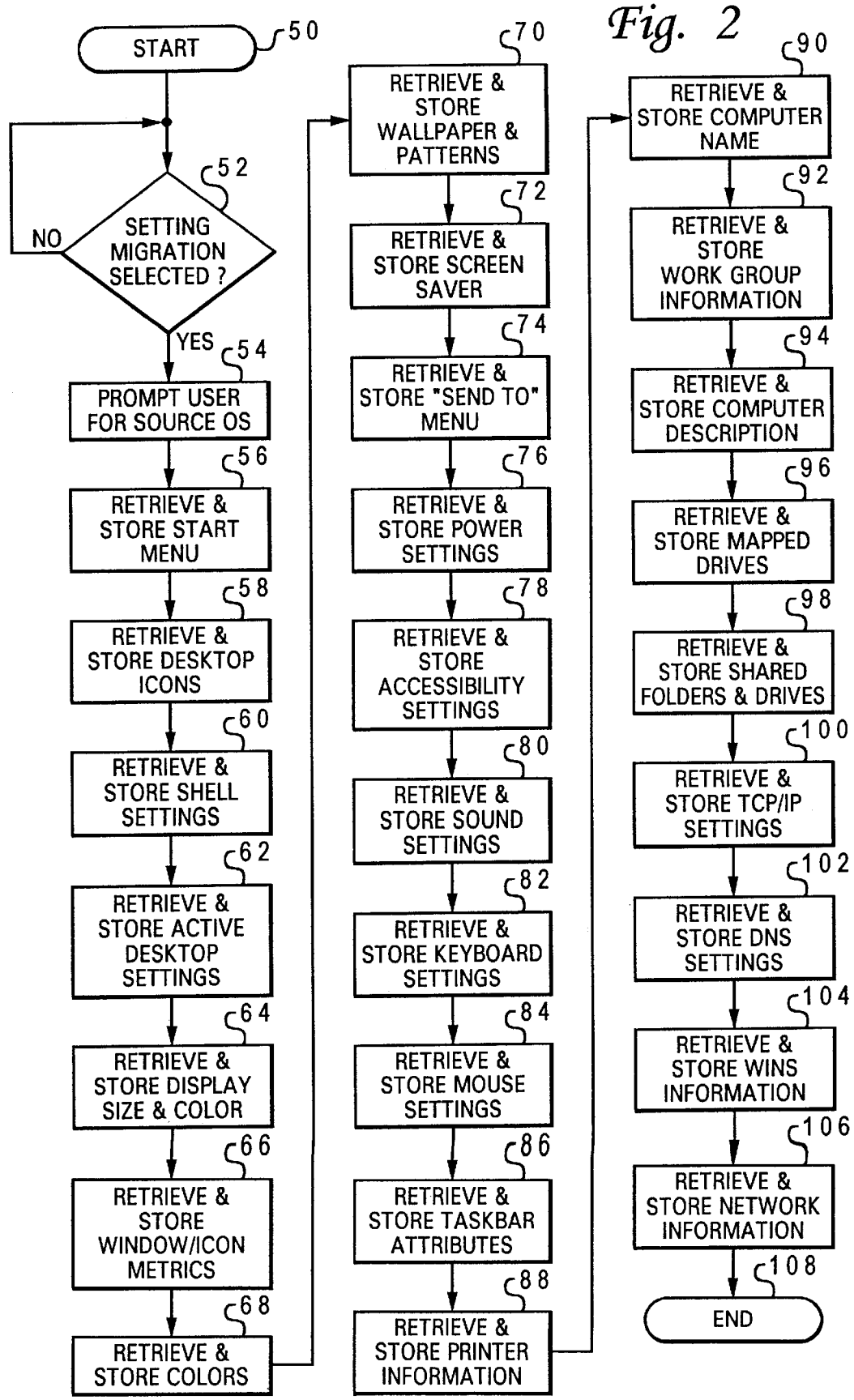
FIG. 2 is a high level flowchart illustrating a process for the retrieval of user system settings from an existing computer system.

Referring now to FIG. 2, there is depicted a high level logic flowchart which illustrates a process which when implemented within a computer program product will accomplish the retrieval of user system settings from existing computer system 10 in accordance with the method and system of the present invention. As depicted, this process begins at block 50 and thereafter passes to block 52. Block 52 illustrates a determination of whether or not setting migration has been selected. If not, the process merely iterates until such time as user indicates that migration of user settings from an existing computer system to replacement computer system is desired.

Still referring to block 52, in the event setting migration has been selected the process passes to block 54. Block 54 depicts the prompting of the user for an identification of the source operating system within the existing computer system. As will apparent upon reference to the foregoing description the identification of the source operating system is required in order permit retrieval of selected user system settings from the various files and directories contained therein. Of course, the process described herein can also query the system directly to determine the identity of the operating system. Next, the process passes to block 56. Block 56 illustrates the retrieval and storing of the "Start Menu." Those skilled in the art will appreciate that the Start menu consists of all files which are located within the Start Menu which are located in directories specified within the registry. The registry, or central hierarchial data base, in Windows 95, for example, includes a registry key: HKEY_CURRENT_USER which typically includes keys identified as:

Software\Microsoft\Windows\CurrentVersion\Explorer\ShellFolders\Start Menu

Software\Microsoft\Windows\CurrentVersion\Explorer\ShellFolders\Start Menu\Programs Software\Microsoft\Windows\CurrentVersion\Explorer\ShellFolders\Start Menu\Programs\Startup Of course, these directories may be different, depending upon the operating system within the existing computer system. For example, the Start Menu is typically "C:\WINDOWS\START MENU" or "C:\WINNT\START MENU" depending upon whether Windows 95/98 or Windows NT is the existing operating system. Thus, knowledge of the operating system is important, as the mere coping of files from an existing computer system to a replacement computer system will not compensate for the difference in directory name. (Microsoft, Windows, and Explorer are trademarks of the Microsoft Corporation of Redmond, Wash.)

Next, the process passes to block 58. Block 58 illustrates the retrieval and storage of desktop icons. Desktop icons include all files which are located in the desktop directory, which as above, is specified within a registry or a central hierarchial data base key. Within a Windows 95/98 operating system the directory containing the desktop icons is specified in the registry key.

HKEY_CURRENT_USER
Software/Microsoft\Windows\CurrentVersion\Explorer\ShellFolders\Desktop.

Again, this directory may differ, depending upon on which operating system is utilized within the existing computer system.

Next, the process passes to block 60. Block 60 illustrate the retrieval and storage of Shell settings. Shell settings are set by the "View" menu from any single or double-pane file viewer and include the View type, including Large Icon, Small Icon, List, or Details; Sort Type, including Name, Type, Date, or Size; whether or not the Toolbar is visible; whether are the StatusBar is visible; whether certain system files (.DDL, .DRV, .SYS) are hidden; whether are not the full MS-DOS path should be displayed in the title bar; and whether the MS-DOS file extensions are shown. (MS-DOS is a trademark of Microsoft Corporation of Redmond, Wash.).

As those skilled in the art may recognize these settings are typically stored within the registry; however, there are no existing application program interface (API) routines which are available to directly retrieval or set these values. Thus, it is necessary to determine these values in an empirical manner by viewing the entire registry and thereafter, changing an element and comparing the changed registry to the preexisting registry utilizing a technique known as "registry differentiation" to those having skill in this art. Thus, shell settings may be determined for each operating system which may be encountered by the method and system of the present invention by differentiating the registry setting within each operating system following each change to the shell settings set forth above. As noted above, this data is typically stored within a registry key such as:

HKEY_CURRENT_USER
Software\Microsoft\Windows\CurrentVersion\Explorer\Exp View\Settings.

Thereafter, the process passes to block 62. Block 62 illustrates retrieval and storage of the ActiveDesktop Settings, including active channels (AC) which may be retrieved and created utilizing existing application program interface (API) routines present within most operating systems. These ratings include: GetDesktopItemCount; GetDesktopItemOptions; GetDesktopItems; ModifyDesktopItem; SetDesktopItem; and, SetDesktopItemOptions.

At this point the process passe to block 64. Block 64 illustrates the retrieval and storage of the display size and color depth. The current display size and color depth can be retrieved and set utilizing the application program interface (API) routine ChangeDisplaySettings. Thereafter, the process passes to block 66. Block 66 illustrates the retrieval and storage of the window\icon metrics utilizing the application program interface (API) routine SytemParametersInfo. This information include icon font name, font size, icon spacing, window border size, window title size, etc.

Next, the process passes to block 68. Block 68 illustrates the retrieval and storage of color schemes created by the user of the existing computer system, typically utilizing the Properties dialog for the Desktop. These parameters may be retrieved utilizing the application program interface (API) routines GetSysColor and SetSysColor. The color schemes actually created by the user are retrieved from the following registry keys:

HKEY_CURRENT_USER\Control Panel\Appearance\Schemes

HKEY_CURRENT_USER\Control Panel\Colors

HKEY_CURRENT_USER\Control Panel\Appearance

The process then passes to block 70. Block 70 illustrates the retrieval and storage of the wallpaper and patterns utilized by the user within the existing computer system. These settings are retrieved and modified utilizing an application program interface (API) routine called SystemParametersInfo. However, if an actual bitmap file is utilized by the user within the existing computer system for the wallpaper and pattern, that bitmap file may be automatically copied by the method and system of the present invention for subsequent installation into the replacement computer system. Additionally, Wallpaper settings (Tile/Center/Stretch) are copied by reading and writing the following registry keys:

HKEY_CURRENT_USER\Control Panel\Desktop\WallPaper

HKEY_CURRENT_USER\Control Panel\Desktop\TileWallPaper

HKEY_CURRENT_USER\Control Panel\Desktop\WallPaperStyle

HKEY_CURRENT_USER\Control Panel\Desktop\WallPaperoriginX

HKEY_CURRENT_USER\Control Panel\Desktop\WallPaperOriginY

Next, the process passes to block 72. Block 72 illustrates the retrieval and storage of a screen saver utilized within the existing computer system. Screen savers are generally stored within SYSTEM.INI and CONTROL.INI. The method and system of the present invention copies specific sections from these files and thereafter, in a manner which will be explained in greater detail herein, copies those sections into the SYSTEM.INI and CONTROL.INI files within the replacement computer system. Next, as illustrated in block 74, the "SendTo" Menu items, which are those items which appear when a user right-clicks onto a desktop item. These items are stored in a manner similar to Desktop Items and Start Menu items. The "Send To" Menu consists of all files located within a directory which is specified by the registry key:

HKEY_CURRENT_USER

Software\Microsoft\Windows\CurrentVersion\Explorer\

ShellFolders\SendTo

This directory may vary from operating system to operating system but it typically set forth as "C:\WINDOWS\SENDTO".

Next, as depicted within block 76, the power management settings selected by the user of the existing computer system utilizing the Control Panel are retrieved and stored. Power management settings may be set and retrieved utilizing the application program interface (API) SystemParametersInfo.

Referring now to block 78, the Accessibility settings for the existing computer system, which may have been modified by the user utilizing the Control Panel are set and retrieved utilizing the same application program interface (API) SystemParametersInfo. Thereafter, as illustrated in block 80, the sound settings which may have been modified by the user utilizing the Control Panel are retrieved. These settings are stored within the registry key:

HKEY_CURRENT_USER\AppEvents

With reference now to block 82, there is depicted the retrieval and storage of keyboard settings from the existing computer system which may have been modified by the user utilizing the Control Panel. Such keyboard settings include keyboard delay, keyboard repeat rate, and caret blink time. These settings are retrieved utilizing the application program interface (API) routines SystemParametersInfo, GetCaretBlinkTime, and SetCaretBlinkTime. Similarly, mouse settings are retrieved and stored, as illustrated in block 84. Mouse settings, as those having ordinary skill in the art will appreciate, may be modified within the existing computer system by a user utilizing the Control Panel. Mouse settings typically include left/right handed usage, tracking speed, double-click region size and double-click time. These settings may be retrieved and stored utilizing the application program interface (API) SystemParametersInfo.

Thereafter, referring to block 86, the taskbar attributes of the existing computer system are determined. Taskbar attributes include the size of the taskbar, the position of the taskbar and the attributes set by the properties dialog of the taskbar including: Show Clock, AutoHide, Always-On-Top, and Show Small Icons in Start Menu. These attributes may be retrieved utilizing the application program interface (API) SHAppBarMessage. As will explained in greater detail herein the setting of taskbar attributes within the replacement computer system requires the method and system of the present invention to simulate the action of a user, as these tasks may not be done automatically utilizing code.

Thereafter, as depicted in block 88, printer information within the existing computer system is retrieved utilizing multiple application program interface (API) routines: EnumPrinters, EnumDrivers, EnumMonitors, AddPrinter, AddPrinterDriver, and GetPrinterDriverDirectory. These routines return all information necessary to install the printer on a new system including files, drivers, settings, queue and port names, etc. Thus, all files necessary to install the printer and its driver into the replacement computer system, if identical operating systems are utilized, are retrieved and stored utilizing the method and system of the present invention. If the replacement computer system utilizes a different operating system, appropriate printer drivers are automatically selected.

Next, connectivity items for the existing computer system are determined. As illustrated within block 90, the system computer name is retrieved and stored utilizing the application program interface (API) routines GetComputerName and SetComputerName. The work group information for the default workgroup, are login domain is then retrieved and stored, as depicted in block 92, from the following registry keys:

for Windows NT:

HKEY_LOCAL_MACHINE\

SOFTWARE\Microsoft\WindowsNT\CurrentVersion\Winlogon

\Default\

DomainName for Windows 95/98:

HKEY_LOCAL_MACHINE\System\CurrentControlSet\Services

\VxD\

VNETSUP\Work Group

The existing computer system description is retrieved and stored, as depicted in block 94 from the registry. This information is contained within the registry key:

HKEY_LOCAL_MACHINE\System\CurrentControlSet\Services

\VxD\

VNETSUP\Comment

Mapped drives within the existing computer system are retrieved and stored, as depicted in block 96. The identification of these drives are retrieved utilizing the application program interface (API) WNetGetConnection. New connections are created utilizing the application program interface (API) WNetAddConnection.

Shared folders and drives are retrieved and stored by accessing selected keys within the registry or central hierarchial data base. For a machine utilized the Windows 95/98 operating system this information is stored within the following registry key:

HKEY_LOCAL_
MACHINE\Software\Microsoft\Windows\
Current Version\Network\LANMAN

For an existing computer system utilizing the Windows NT operating system this information is stored in the following registry key:

HKEY_LOCAL_
MACHINE\Software\CurrentControlSet\
Services\LanmanServer\Shares

As will be set forth in greater detail herein, converting this information from one operating system to another operating system may be difficult as the registry information is often incompatible.

Referring now to block 100, the TCP/IP settings for the existing are retrieved and stored. This accomplished for each adapter within the existing computer system and the method and system of the present invention stores each adapter IP Address, NetMask, and gateway(s). This information is generally not stored in a straight-forward manner as described above. For example, within a Windows 95/98 operating system this hardware is enumerated under the registry key:

HKEY_LOCAL_
MACHINE\System\CurrentControlSet\Services
\Class\Net

This registry key retrieves hardware ID's like "0000", "0001" etc. These ID's represent installed adapters. Method and System of the present invention must then look for a binding information to TCP/IP for these adapters under the key:

HKEY_LOCAL_MACHINE\Enum\Network\MSTCP

IP addresses, etc. are then retrieved. A similar process must be under taken before Windows NT operating system utilizing different registry keys.

Next, referring to block 102, the DNS settings for the existing computer system are retrieved and stored. These settings are stored within a registry key. For an existing computer system utilizing Windows 95/98 operating system these settings are stored within the registry key:

HKEY_LOCAL_
MACHINE\System\CurrentcontrolSet\Services
\VxD\MSTCP

For existing computer systems utilizing the Windows NT operating system these settings are stored within the registry key:

HKEY_LOCAL_
MACHINE\System\CurrentControlSet\Services
\TCPRP\
Parameters

Additionally, information under the following values must be retrieved and set: Domain, HostName, NameServer, Searchlist, and EnableDNS. The format for these values varies slightly from Windows 95/98 to Windows NT and is simply modified on-the-fly if settings are loaded from mismatched operating systems.

Finally, WINS information is retrieved and stored from the following registry key:

HKEY_LOCAL_
MACHINE\System\CurrentControlSet\Services
\VxD\MSTCP

Within existing computer systems operating within operating utilizing Windows 95/98 operating system. This feature has not yet been implemented within the Windows NT operating system since that operating system can have is multiple instances, once for each adapter, whereas Windows 95/98 only utilizes one instance. Finally, dial up networking information is retrieved and stored from the registry under the following key:

HKEY_CURRENT_USER\RemoteAccess

Thereafter, the process passes to block 108 and terminates.

This information may then be transferred from the existing computer system to the replacement computer system via network 20 (see FIG. 1) or by transferring the data and executable code representing the method and system of the present invention utilizing a diskette, such as diskette 30 (see FIG. 1), which contains a computer program product.

Figure 3:
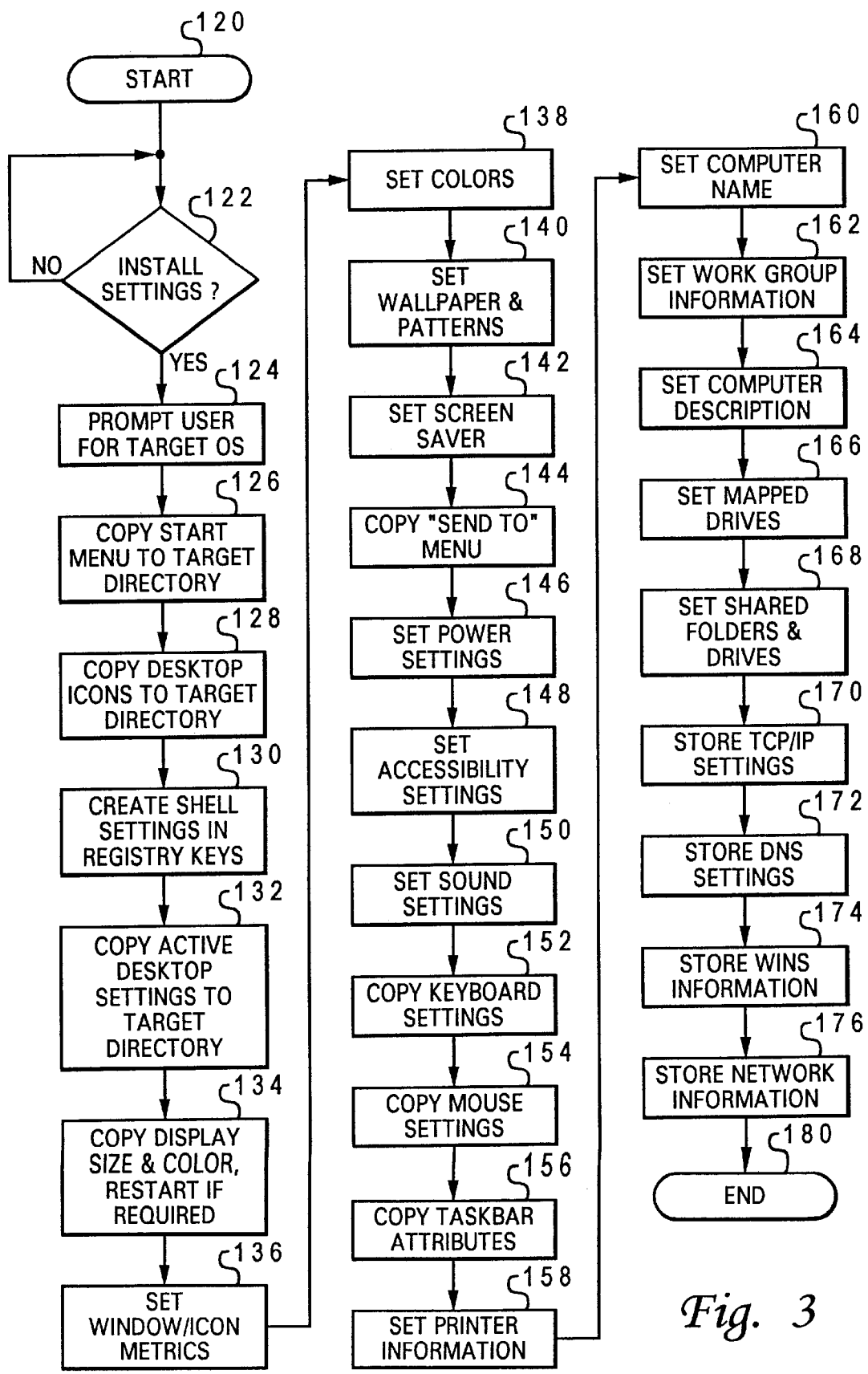
FIG. 3 is a high level logic flowchart illustrating the installation of user system settings into a replacement computer system.

Finally, with reference to FIG. 3, there is depicted a high level logic flowchart illustrating the installation of user system settings into a replacement computer system in accordance with the method and system of the present invention. As illustrated, this process begin at block 120, and thereafter passes to block 122. Block 122 illustrates a determination of whether or not the user desires to install user system settings within a replacement computer. If not, the process merely iterates until such time as a user elects to install user system settings within the replacement computer.

Still referring to block 122, if the user has elected installation of user system settings within the replacement computer the process passes to block 124. Block 124 illustrates the prompting of the user for an identification of the target operating system. As described above the files, directories and keys utilized by an operating system may vary from one operating system to another and thus, it is necessary to identify the target operating system for installation of the user system settings. Again, the process described herein can also automatically query the replacement computer system to determine the target operating system.

Thereafter, as illustrated within blocks 126 and 128, the Start Menu and Desktop icons retrieved from the existing computer system are stored within the appropriate directory within the replacement computer system. The process then passes to block 130.

As described above, the settings within the registry keys which correspond to variations in the shell settings of a computer system have been empirically determined by differentiating the registry prior to and immediately following a variation of a shell setting. Thereafter, the modifications to the registry within the replacement computer system which are necessary to implement the shell settings from the user settings within the existing computer system are implemented.

Next, the process passes to block 132. Block 132 depicts the copying of the active desktop settings to the appropriate directory within the replacement computer system. Thereafter, the process passe to block 134. Block 134 illustrates the installation of the display size and color depth values retrieved from the computer system. Those skilled in the art will appreciate that selected graphic adapters/device drivers permit a user to change the resolution of a computer display on-the-fly; however, other graphic adapters/device drivers require the computer system to be restarted following such modification. Having identified the graphic adapters or device drivers present within the replacement computer system the method and system of the present invention will automatically restart the system in order to implement the selection of user system settings from the display system, if necessary.

Thereafter, as depicted in blocks 136 and 138, the window/icon metrics and colors previously retrieved from the existing computer system are set within the replacement computer system.

Next, as depicted in block 140, the wallpaper and patterns from the existing computer system are set within the replacement computer system. Additionally, as described above, if an actual bitmap file is utilized for wallpaper and patterns within the existing computer system, that file is automatically loaded into the replacement computer system at this time.

Next, the screen saver, send to menu, power settings and accessibility settings from the existing computer system are set within the replacement computer system as depicted at blocks 142, 144, 146 and 148.

Thereafter, the process passes to block 150. Block 150 illustrates the setting of the sound settings copied from the existing computer system. Similarly, the keyboard and mouse settings are copied to the replacement computer system as depicted in blocks 152 and 154.

At this point, as depicted in block 156, the taskbar attributes for the replacement computer system are set, utilizing the information which was retrieved from the existing computer system. As noted above, the selection of a particular taskbar attributes can not be automatically set by code and in accordance with an important feature of the present invention, the position of the taskbar, is accomplished utilizing the mouse_event application program interface (API) routine to simulate the action of the user moving the mouse until it is positioned over a blank spot on the taskbar, simulating a click-and-drag action to the appropriate window edge, and thereafter simulating the release of the mouse button. The mouse_event application program interface (API) routine adds commands to the mouse's input queue as though the user had performed these actions, and thereafter, the operating system processes these events as normal user events. Resizing the taskbar utilizing code also involves the mouse_event application program interface (API) to simulate the action of the user moving the mouse until it is positioned over the re-sizeable edge of the taskbar, simulating a click-and-drag action to the appropriate size, and thereafter simulating the releasing of the mouse button.

Finally, modifying the attributes Show Clock, Auto Hide, Always-On-Top, and Show Small Icons in Start Menu is performed by retrieving the Window Handle of the task file utilizing the application program interface (API) routine FindWindow and thereafter sending a message asking that routine to invoke its Properties Dialog. The handle of this window is retrieved and, messages are sent to the various controls on the dialog to check or uncheck the control as desired. The dialog may then be closed by sending an appropriate message.

Referring now to block 158, printer information retrieved from the existing computer system is installed within appropriate directories within the replacement computer system if the operating systems are identical. If the replacement computer system already includes a matching printer driver therein no action is taken. If the driver stored within the data retrieved from the existing computer system is more recent than that contained in the replacement computer system the local copy of the driver is overwritten automatically. Alternatively, if the operating systems are different, appropriate printer drivers are selected and installed.

Next, as depicted in blocks 160, 162, 164, and 166, the computer name, work group information, computer description and map drives within the replacement are set, based upon the data retrieved from the existing computer system.

With reference now to block 168, the shared folders and drives information is set within the replacement computer system. As noted above, converting this information from a Windows 95/98 operating system to a Windows NT operating system is nontrivial, as the registry information is incompatible. Within Windows NT operating system computer system permission for shared files and folders is granted to groups and users. Within Windows 95/98 operating systems read/write permission is granted via passwords. When migrating from Windows 95/98 to Windows NT, the new shares are created as ReadOnly to all groups and permissions must be modified manually. When migrating from Windows NT to Windows 95/98, the new shares are created as ReadOnly with no password. Passwords must then be modified manually.

Referring now to block 170, the adapter binding information necessary to create TCP/IP settings is stored within the replacement computer system. Similarly, the DNS settings are stored within the appropriate registry key, as depicted in block 172. Similarly, block 174 and block 176 depicts the storing of the WINS and network information within the appropriate key. Thereafter, the process passes to block 180 and terminates.

Upon reference to the foregoing, those skilled in the art will appreciate the method and system of the present invention provides a technique whereby user system settings within an existing computer system may be automatically retrieved and converted into appropriate format for utilization within a replacement computer system, possibly including a different operating system. In this manner the environment within a user operates can be uniformly maintained while upgrading the hardware platform utilized by the user. This technique provides a highly efficient manner for upgrading hardware platforms within a computer based enterprise while minimizing the administrative burden normally involved in such an upgrade.

While the invention has been particularly shown and described with reference to a preferred embodiment, it will be understood by those skilled in the art that various changes in form and detail may be made therein without departing from the spirit and scope of the invention.

What is claimed is:

1. A method for migrating user system settings from an existing computer system to a replacement computer system, said method comprising the steps of:

in response to a user input:

automatically copying and storing selected portions of a central hierarchial data base within said existing computer system;

initiating a plurality of application program interface routines to retrieve and store selected settings within said existing computer system;

retrieving and storing adapter binding information for all adapters present within said existing computer system;

transferring said stored selected portions of said central hierarchial data base, said selected settings and said adapter binding information from said existing computer system to a replacement computer system; and automatically copying said stored selected portions of said central hierarchial data base, said selected settings and said adapter binding information into said replacement computer system such that user system settings from said existing computer system are migrated to said replacement computer system.

2. The method for migrating user system settings from an existing computer system to a replacement computer system according to claim 1, wherein said step of automatically copying and storing selected portions of said central hierarchial data base further comprises the step of identifying a directory within said central hierarchical data base containing all files within a start menu within said existing computer system and copying and storing said files.

3. The method for migrating user system settings from an existing computer system to a replacement computer system according to claim 1, wherein said step of automatically copying and storing selected portions of said central hierarchial data base further comprises the step of identifying a directory within said central hierarchial data base containing all files specifying desktop icons within said existing computer system and copying and storing said files.

4. The method for migrating user system settings from an existing computer system to a replacement computer system according to claim 1, wherein said step of automatically copying and storing selected portions of said central hierarchial data base further comprises the step of identifying selected portions of said central hierarchial data base which include shell settings within said existing computer system and copying and storing said selected portions.

5. The method for migrating user system settings from an existing computer system to a replacement computer system according to claim 1, wherein said step of initiating a plurality of application program interface routines to retrieve and store selected settings within said existing computer system further comprises the step of initiating a plurality of application program interface routines to retrieve and store wallpaper settings and patterns from said existing computer system.

6. The method for migrating user system settings from an existing computer system to a replacement computer system according to claim 1, wherein said step of initiating a plurality of application program interface routines to retrieve and store selected settings within said existing computer system further comprises the step of initiating an application program interface routine to retrieve and store power management settings from said existing computer system.

7. The method for migrating user system settings from an existing computer system to a replacement computer system according to claim 1, wherein said step of initiating a plurality of application program interface routines to retrieve and store selected settings within said existing computer system further comprises the step of initiating a plurality of application program interface routines to retrieve and store keyboard settings from said existing computer system.

8. The method for migrating user system settings from an existing computer system to a replacement computer system according to claim 1, wherein said step of initiating a plurality of application program interface routines to retrieve and store selected settings within said existing computer system further comprises the step of initiating an application program interface routine to retrieve and store taskbar attributes from said existing computer system.

9. The method for migrating user system settings from an existing computer system to a replacement computer system according to claim 8, wherein said step of automatically copying said stored selected portions of said central hierarchial data base, said selected settings and said adaptor binding information into said replacement computers system further comprises the step of automatically initiating a code sequence within said replacement computer system which emulates user actions required to set said retrieved taskbar attributes.

10. A system for migrating user system settings from an existing computer system to a replacement computer system, said system comprising:

means for automatically copying and storing selected portions of a central hierarchial data base within said existing computer system in response to a user input;

means for initiating a plurality of application program interface routines to retrieve and store selected settings within said existing computer system in response to said user input;

means for retrieving and storing adapter binding information for all adapters present within said existing computer system in response to said user input;

means for transferring said stored selected portions of said central hierarchial data base, said selected settings and said adapter binding information from said existing computer system to a replacement computer system; and means for automatically copying said stored selected portions of said central hierarchial data base, said selected settings and said adapter binding information into said replacement computer system such that user system settings from said existing computer system are migrated to said replacement computer system.

11. The system for migrating user system settings from an existing computer system to a replacement computer system according to claim 10, wherein said means for automatically copying and storing selected portions of said central hierarchial data base within said existing computer system comprises means for identifying a directory within said central hierarchial data base containing all files within a start menu within said existing computer system and means for copying and storing said files.

12. The system for migrating user system settings from an existing computer system to a replacement computer system according to claim 10, wherein said means for automatically copying and storing selected portions of said central hierarchial data base within said existing computer system comprises means for identifying a directory within said central hierarchial data base containing all files specifying desktop icons within said existing computer system and means for copying and storing said files.

13. The system for migrating user system settings from an existing computer system to a replacement computer system according to claim 10, wherein said means for automatically copying and storing selected portions of said central hierarchial data base further comprises means for identifying selected portions of said central hierarchial data base which include shell settings within said existing computer system and means for copying and storing said selected portions.

14. The system for migrating user system settings from an existing computer system to a replacement computer system according to claim 10, wherein said means for initiating a plurality of application program interface routines to retrieve and store selected settings within said existing computer system further comprises means for initiating a plurality of application program interface routines to retrieve and store wallpaper settings and patterns from said existing computer system.

15. The system for migrating user system settings from an existing computer system to a replacement computer system according to claim 10, wherein said means for initiating a plurality of application program interface routines to retrieve and store selected settings within said existing computer system further comprises means for initiating an application program interface routine to retrieve and store power management settings from said existing computer system.

16. The system for migrating user system settings from an existing computer system to a replacement computer system according to claim 10, wherein said means for initiating a plurality of application program interface routines to retrieve and store selected settings within said existing computer system further comprises means for initiating a plurality of application program interface routines to retrieve and store keyboard settings from said existing computer system.

17. The system for migrating user system settings from an existing computer system to a replacement computer system according to claim 10, wherein said means for initiating a plurality of application program interface routines to retrieve and store selected settings within said existing computer system further comprises means for initiating an application program interface routine to retrieve and store taskbar attributes from said existing computer system.

18. The system for migrating user system settings from an existing computer system to a replacement computer system according to claim 17, wherein said means for automatically copying said stored selected portions of said central hierarchial data base, said selected settings and said adaptor binding information into said replacement computers system further comprises means for automatically initiating a code sequence within said replacement computer system which emulates user actions required to set said retrieved taskbar attributes.

19. A computer program product for migrating user system settings from an existing computer system to a replacement computer system, said computer program product comprising:

storage media adapted for utilization within a computer system;
instruction means embodied within said storage media for automatically copying and storing selected portions of a central hierarchial data base within said existing computer system in response to a user input;
instruction means embodied within said storage media for initiating a plurality of application program interface routines to retrieve and store selected settings within said existing computer system in response to said user input;
instruction means embodied within said storage media for retrieving and storing adapter binding information for all adapters present within said existing computer system in response to said user input;
instruction means embodied within said storage media for transferring said stored selected portions of said central hierarchial data base, said selected settings and said adapter binding information from said existing computer system to a replacement computer system; and
instruction means embodied within said storage media means for automatically copying said stored selected portions of said central hierarchial data base, said selected settings and said adapter binding information into said replacement computer system such that user system settings from said existing computer system are migrated to said replacement computer system.

\* \* \* \* \*